United States Patent [19]

Shimizu et al.

[11] 4,033,933

[45] July 5, 1977

[54] RUBBER COMPOSITIONS AND METHODS FOR PRODUCTION THEREOF STABILIZED

[75] Inventors: Akira Shimizu; Manabu Kusano; Takeshi Takami, all of Ibaragi, Japan

[73] Assignee: Kuraray Co., Ltd., Kurashiki, Japan

[22] Filed: Oct. 28, 1975

[21] Appl. No.: 626,603

[30] Foreign Application Priority Data

Oct. 31, 1974 Japan .................... 49-125793

[52] U.S. Cl. ............... 260/45.85 R; 260/31.4 R; 260/32.6 A; 260/33.2 R; 260/34.2; 260/45.9 AA; 260/45.95 L; 260/45.95 S

[51] Int. Cl.² .............. C08K 5/17; C08K 5/10; C08K 5/06

[58] Field of Search ........... 260/45.9 AA, 45.95 L, 260/45.95 S, 45.85 R, 31.4 R, 32.6 A, 33.2 R, 34.2, 23.7 M

[56] References Cited

UNITED STATES PATENTS

| | | | |
|---|---|---|---|
| 2,363,617 | 11/1944 | Patrick | 260/31.4 R |
| 2,797,203 | 6/1957 | Barber et al. | 260/33.2 R |
| 3,117,931 | 1/1964 | Westlund et al. | 252/51.5 |
| 3,567,670 | 3/1971 | Nagle | 260/33.2 R |
| 3,699,173 | 10/1972 | Osberg et al. | 260/23.7 M |

FOREIGN PATENTS OR APPLICATIONS 1,203,462  8/1962  Germany

OTHER PUBLICATIONS

Chemical Engineering Progress, vol. 57, No. 5, May 1961, pp. 53 and 54.

*Primary Examiner*—V. P. Hoke
*Attorney, Agent, or Firm*—Barry Kramer

[57] ABSTRACT

Synthetic diene rubber stock for the production of vulcanized articles can be improved with respect to thermal discoloration at relatively high temperature by mixing therewith a high molecular weight alkylene oxide compound. The high molecular weight alkylene oxide compound also is effective to facilitate the drying operation of the wet rubber stock by means of a screw type drier.

10 Claims, No Drawings

RUBBER COMPOSITIONS AND METHODS FOR PRODUCTION THEREOF STABILIZED

This invention relates, in one aspect, to diene-type synthetic rubber compositions having improved thermal discoloration and degradation properties. In another aspect, the invention relates to a method for producing such compositions which involves a substantially simplified drying procedure.

As is well known, diene-type synthetic rubbers are produced by polymerization procedures, such as solution or emulsion polymerization, and are generally subjected to coagulation, washing and/or other procedures in water after polymerization. Thus, the rubbers invariably experience the state of being wet with water before they are brought to market. Heretofore, screw-type driers have mostly been employed for drying such wet rubbers.

A screw type drier is also called an extruder type drier wherein a screw blade or vane mounted on a rotatable shaft in an elongated barrel permits a polymer to advance through the barrel and kneads the polymer by shearing forces. A typical screw type drier is manufactured by V.D. Anderson Co., U.S.A., which is composed of a combination of an expeller and an expander as described in "Chemical Engineering Progress", Vol. 57, No. 5, page 53 (1961) and "Chemical Engineering", Vol. 68, No. 23, page 9 (1961). Another example is an extruding drier manufactured by Welding Engineering Co., U.S.A., which is disclosed in "Rubber and Plastics Age", Vol. 42, page 1227 (1961) and British Pat. No. 965,183. The wet rubber generates heat to a high temperature of 80° to 200° C under the influence of shearing forces in the screw type drier and then, the thus heated rubber stock is extruded into open air from the discharge nozzle, resulting in the explosive evaporation and removal of water contained in the rubber. During the process, there takes place a stagnation and adhesion of rubber in the vicinity of the dryer discharge nozzle, which not only results in increased power consumption but leads to plugging of the nozzle, thus making it impossible to operate the dryer continuously over many consecutive hours. Therefore, in the drying of wet synthetic rubber by means of a screw-type dryer, it becomes necessary to replace the dryer nozzle with a new one or carry out an overhaul of the same after each appropriate time of operation Furthermore, the rubber thus dried, which usually is marketed in the form of a bale, still retains heat evolved by the drying procedure because the heat conductivity of rubber is low. Consequently, the heat from the drying remains accumulated for a long period of time in the inner part of the rubber bale. Generally, rubbers in the raw state and, particularly, the diene-type rubbers produced by using an anionic catalyst or Ziegler type catalyst tend to discolor, yellow or brown, on prolonged exposure to high temperatures over 60° C., thus resulting in a reduction in commercial value for certain uses. One of the outstanding advantages of synthetic rubber over natural rubber is the more satisfactory hue of the former and, in applications where whiteness or light colors are required, the aforementioned discoloration is a considerable disadvantage. It seldom occurs that the rubber withdrawn from the dryer is immediately subjected to mixing with compounding ingredients for the manufacture of vulcanized or cured rubber articles. Usually, the rubber is left standing or stocked for a substantial period of time, during which time the discoloration of rubber by the accumulated heat progresses.

It is, therefore, an object of this invention to provide a diene-type synthetic rubber having improved resistance to thermal discoloration in the raw state prior to the compounding process in which the rubber is mixed with compounding ingredients such as vulcanizing agents, vulcanization accelerators, fillers and the like for the production of vulcanizates. Another object of this invention is to provide a method of drying the wet synthetic diene rubber, preventing plugging of the discharge nozzle of the afore-described screw-type dryer and, thereby, facilitating continuous, prolonged operation of the dryer.

Still another object of this invention is to facilitate the drying operation of wet diene-type rubber with the use of a screw-type dryer and to prevent discoloration of the so-obtained dried rubber.

It has been found in accordance with the present invention, that the above-mentioned objects are accomplished by a rubber composition which comprises (a) a synthetic diene rubber stock and (b) a high molecular weight alkylene oxide in an amount of 0.005 to 5 parts by weight per 100 parts by weight of said rubber stock, said alkylene oxide having a polyalkylene oxide residue, in the molecule, of the general formula:

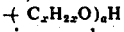

wherein $x$ and $a$, respectively, are numbers of at least 2 and being composed of carbon, hydrogen and oxygen, or composed of carbon, hydrogen, oxygen and nitrogen.

Also, the above-mentioned objects are accomplished by a method of producing said rubber composition which comprises adding 0.005 to 5 parts by weight of the alkylene oxide to 100 parts by weight of said rubber stock before said rubber stock is discharged from the screw type drier.

The high molecular weight alkylene oxide compounds employed in the practice of this invention include the following compounds:

1. Polyalkylene glycols and polyalkylene glycol monoalkyl ethers which have the following general formula (I):

wherein R stands for a hydrogen atom or an alkyl radical of 1 to 20 carbon atoms; $x$ and $a$, respectively, stand for a number of at least 2.

As typical examples, there may be mentioned polyethylene glycol, polypropylene glycol, polybutylene gylcol, and the like and their ethers such as the corresponding methyl, ethyl, propyl, butyl, hexyl, octyl and other ethers.

2. Polyalkylene glycol monoesters of the following general formula (II):

wherein R stands for an alkyl radical of 1 to 20 carbon atoms; $x$ and $a$, respectively, stand for a number of at least 2.

As examples, there may be mentioned the methyl, ethyl, propyl, butyl, hexyl, and other esters of polyethylene glycol, polyproplyene glycol, polybutylene glycol or the like.

3. The ammonia- or amine-polyalkylene glycol adducts of the following general formula (III):

wherein at least one of $R_1$, $R_2$ and $R_3$ stands for $(C_xH_{2x}O)_aH$, and the others can be a hydrogen atom or an alkyl radical of 1 to 20 carbon atoms; $x$ and $a$, respectively, stand for a number of at least 2.

As typical examples, there may be mentioned the following compounds:

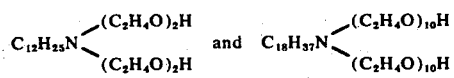

4. The alkylene polyamine-polyalkylene glycol adducts having the following general formula:

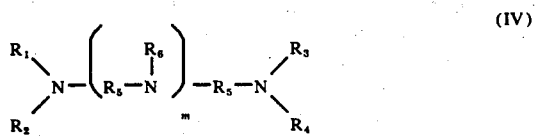

wherein at least one of $R_1$, $R_2$, $R_3$ and $R_4$ stands for $(C_xH_{2x}O)_aH$ and the others can be a hydrogen atom or an alkyl radical of 1 to 20 carbon atoms; $R_5$ stands for an alkylene radical of 1 to 6 carbon atoms; $R_6$ stands for a hydrogen atom, an alkyl radical of 1 to 20 carbon atoms or $(C_xH_{2x}O)_aH$; $x$ and $a$, respectively, stand for a number of at least 2; $m$ is zero or a number of at least 1.

As typical examples, there may be mentioned

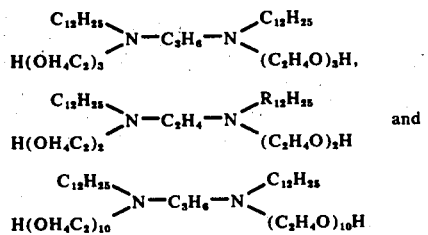

Relatively low molecular weight of the alkylene oxide compound causes easy evaporation of said compound from the rubber composition upon heating. In view of this tendency, the high molecular alkylene oxide compounds used in the invention are desired to have a molecular weight of at least 120. Accordingly, it is preferred to select the number of $x$, and $m$ in the above general formula so that the high molecular weight alkylene oxide compound has a molecular weight of at least 120, and preferably in the range of 140 to 50,000. Generally, use is made of a high molecular weight alkylene oxide compound wherein $x$ is a number of 1 to 4, inclusive, $m$ is a number of 0 or 1 and $a$ is a number that can give the compound a molecular weight within the above-indicated range. The alkylene oxide compounds may be used alone or in admixture with each other. In accordance with this invention, polyethylene glycol with an average molecular weight of 200 to 20,000 and polypropylene glycol with an average molecular weight of 300 to 6,000, particularly in the range of 400 to 1,200, were found to provide the most satisfactory results.

As pointed out hereinbefore, in the drying procedure of conventional diene-type synthetic rubber by means of a screw-type dryer, plugging is encountered in the vicinity of the discharge nozzle of the dryer due to the stagnation and adhesion of the rubber. This phenomenon imposes an additional load upon the dryer which, in turn, causes an increase in power consumption. According to the invention, when the high molecular alkylene oxide compound is added to the rubber stock before the rubber is ultimately withdrawn from the dryer, plugging of the dryer is considerably reduced or restrained so that the dryer can be operated continuously for prolonged periods of time that is by far longer than the time normally operable in the absence of said alkylene oxide compound. Moreover, the resultant rubber composition, in the state of raw rubber free from compounding ingredients such as vulcanizing agents, accelerators and fillers, is impervious to discoloration and degradation even when maintained at a comparatively high temperature, for example at 60° to 200° C. In order to attain the aforesaid different effects according to the invention, the high molecular weight alkylene oxide compound should be employed in a proportion of at least 0.005 weight part, preferably at least 0.01 weight part or, for still better results, at least 0.05 weight part per 100 weight parts of the rubber. The weight parts per 100 weight parts of rubber will hereinafter be abbreviated as PHR. Use of the high molecular weight alkylene oxide in amounts exceeding 5 PHR may deteriorate the properties of the resultant rubber composition, for example, the Mooney viscosity.

Other advantages of this invention that can be materialized by employing a high molecular weight alkylene oxide compound which is represented by the above general formula (III) or (IV) and which consists of carbon, hydrogen, oxygen and nitrogen are: (1) the corrosion of the internal walls of the screw-type dryer is prevented; (2) the cure rate of the resultant rubber composition is increased; and (3) the stress at elongation and hardness of the vulcanizate are increased. In more detail, synthetic rubber often contains acidic contaminants, for example acidic residues derived from diene monomer polymerization catalysts, particularly Ziegler type catalysts and such contaminants cannot completely be removed by washing the rubber. These acidic contaminants are corrosive to iron, steel and stainless steel and, therefore, are determinant factors in the serviceable life of the dryer. However, when the high molecular alkylene oxide compounds consisting of carbon, hydrogen, oxygen and nitrogen are incorporated into the rubber in accordance with this invention, the acidic substances in the rubber are neutralized, with the result that corrosion of the dryer is inhibited. Furthermore, diene-type synthetic rubber, as compared with natural rubber, is generally slow in vulcanization rate or cure rate and also low in the stress at elongation and hardness in the state of vulcanizates, and to overcome these disadvantages, it is often necessary to employ an increased amount of vulcanizing agent and/or filler. However, the rubber compositions containing a nitrogen-containing alkylene oxide compound according to this invention display marked improvements in all the aforementioned aspects.

In the practice of this invention, when it is necessary to suppress the aforementioned tendency toward plugging of the dryer while preventing the thermal discoloration of diene-type synthetic rubber, the addition of said high molecular alkylene oxide compound to rubber must take place before the rubber is ultimately discharged from the dryer. For example, the alkylene oxide compound of high molecular weight may be fed along with the rubber stock to the dryer or incorporated in the rubber stock at an intermediate position of the drier. The alkylene oxide compound of high molecular weight may be used in any form (liquid or solid), as an aqueous solution or an aqueous dispersion. The solid alkylene oxide compound melts at the drying temperature and, therefore, may be directly fed to the dryer, although it is more advantageous to use the compound as an aqueous solution or dispersion.

As the diene-type synthetic rubber for use in the practice of this invention, there may be mentioned the rubbers derived from conjugated dienes or those based on conjugated dienes, such as cis-1,4-polyisoprene, cis-1, 4-polybutadiene, isoprene-styrene copolymers, isoprene-acrylonitrile copolymers, butadiene-styrene copolymers, butadiene-acrylonitrile copolymers, polystyrene-polyisoprene-polystyrene block copolymers, polystyrene-polybutadiene-polystyrene block copolymers, etc., the graft copolymers obtained by grafting other monomers such as acrylic acid, methyl methacrylate, acrylamide, etc. onto the above polymers and the modified polymers obtained by reacting the above polymers with maleic acid, maleic anhydride, maleimide or the like.

The following examples are further illustrative of this invention, it being understood that many changes and modifications may be made within the scope of the claims appended hereto. Unless otherwise specified, all percentages and parts are by weight.

EXAMPLE 1

As the rubber stock, use was made of a cis-1,4-polyisoprene (hereinafter referred to briefly as IR) which had a cis-1,4 content of 98% and an inherent viscosity ($\eta$) in toluene at 30° C of 4.56 dl/g and which contained 1 weight % of 2,6-di-t-butyl-p-cresol as an antioxidant.

To a 5% solution of the above IR in benzene was added polypropylene glycol (hereinafter referred to as PPG) with an average molecular weight of 800, and the benzene was removed from the thus-prepared homogeneous solution.

The above IR composition was heated in an air-circulating type dryer at 70° C for the time periods indicated in Table 1 and the hues of the samples (each 3 cm in thickness) were evaluated by determining the index number of the Gardner's standard color liquid corresponding to the hues of the samples. The results are set forth in Table 1. The resistance to thermal discoloration of the PPG-containing IR was found to be quite pronounced and satisfactory.

Table 1

| Amount of added PPG (PHR) | The hues of IR After heating for | | | | |
|---|---|---|---|---|---|
| | 0 hours | 6 hours | 12 hours | 24 hours | 48 hours |
| 0 | 1 (White) | 2 (White) | 5 (Pale yellow) | 9 (Yellow) | 10 (yellow) |
| 0.005 | 1 (White) | 1 (White) | 1 (White) | 2 (White) | 3 (Pale yellow) |
| 0.2 | 1 (White) | 1 (White) | 1 (White) | 1 (White) | 1 (White) |
| 1 | 1 (White) | 1 (White) | 1 (White) | 1 (White) | 1 (White) |
| 5 | 1 (White) | 1 (White) | 1 (White) | 1 (White) | 1 (White) |
| 10 | 1 (White) | 1 (White) | 1 (White) | 1 (White) | 1 (White) |

EXAMPLE 2

By means of an open-roll mill, the same IR as used in Example 1 was mixed with 0.2 PHR of the high molecular alkylene oxide compounds indicated in Table 2, and each of the resultant compositions were heated in an air-circulating type dryer at 100° C. The hues of the compositions after predetermined times of heating were evaluated.

The results are set forth in Table 2.

Table 2

| High molecular weight alkylene oxide compound | The hues of IR After heating for | | | | |
|---|---|---|---|---|---|
| | 0 hour | 6 hours | 12 hours | 24 hours | 48 hours |
| Control (not added) | 1 (White) | 2 (Pale yellow) | 5 (Pale yellow) | 7 (Yellow) | 11 (Yellowish tan) |
| (1) $HO(C_2H_4O)_2H$ | 1 (White) | 1 (White) | 2 (Pale yellow) | 5 (Pale yellow) | 6 (Pale yellow) |
| (2) $HO(C_3H_6O)_{20}H$ | 1 (White) | 1 (White) | 1 (White) | 1 (White) | 2 (White) |
| (3) $CH_3COO(C_2H_4O)_{10}H$ | 1 (White) | 1 (White) | 1 (White) | 1 (White) | 2 (White) |
| (4) $(C_{12}H_{25})_2N(C_2H_4O)_{10}H$ | 1 (White) | 1 (White) | 1 (White) | 1 (White) | 2 (White) |
| (5) $CH_3O(C_2H_4O)_{10}H$ | 1 (White) | 1 (White) | 1 (White) | 1 (White) | 2 (White) |

EXAMPLE 3

A small-size extruder was charged with IR, together with 0.2 PHR of polyethylene glycol (hereinafter referred to as PEG) having the average molecular weights indicated in Table 3. In this manner, various PEG-containing IR compositions were obtained. (The temperature of the rubber in the extruder was 170°–180° C).

Each of the above compositions was heated at 100° and 140° C., respectively, for predetermined times and the hues and degrees of thermal degradation (heat aging) were determined. The extent of thermal degradation was determined by calculating the plasticity retention index (hereinafter referred to as PRI) according to the following equation based on the plasticity value obtained from a Wallace Rapid Plastomer.

$$PRI\ (\%) = \frac{\text{Plasticity of sample after heating}}{\text{Plasticity of sample before heating}} \times 100$$

It should be understood that the higher the PRI value, the greater is the resistance of rubber to thermal degradation.

As will be seen from Table 3, the thermal discoloration and thermal degradation properties of IR are significantly improved by the addition of PEG.

Table 3

| Item | Sample (Control PEG not added) | PEG added (0.2 PHR) Mol. wt. 200 | Mol. wt. 1000 | Mol. wt. 6000 |
|---|---|---|---|---|
| 1.) Hue | | | | |
| Before heating | 1 (White) | 1 (White) | 1 (White) | 1 (White) |
| 100° C., after 6 hrs. | 3 (Pale yellow) | 1 (White) | 1 (White) | 1 (White) |
| 100° C., after 24 hrs. | 9 (Yellow) | 1 (White) | 1 (White) | 1 (White) |
| 100° C., after 48 hrs. | 11 (Yellowish tan) | 2 (White) | 2 (White) | 2 (White) |
| 140° C., after 2 hrs. | 5 (Pale yellow) | 1 (White) | 1 (White) | 1 (White) |
| 140° C., after 4 hrs. | 8 (Yellow) | 2 (White) | 2 (White) | 2 (White) |
| 140° C., after 6 hrs. | 11 (Yellowish tan) | 6 (Pale 10 yellow) | 6 (Pale yellow) | 6 (Pale yellow) |
| 2) PRI (%) | | | | |
| 100° C., 6 hrs. | 75 | 81 | 80 | 83 |
| 100° C., 12 hrs. | 46 | 54 | 52 | 54 |
| 100° C., 24 hrs. | Less than 5 (liquid) | 14 | 15 | 13 |
| 140° C., 30 min. | 43 | 56 | 54 | 51 |
| 140° C., 60 min. | 26 | 33 | 31 | 30 |

EXAMPLE 4

A small screw-type dryer (screw diameter 40 mm, screw length 110 cm, revolutionary speed of 30 r.p.m.) fitted with a 5-orifice nozzle (orifice diameter 2 mm) was charged with IR crumbs having a water content of 12%, together with 0.2 PHR of the polyethylene glycols indicated in Table 4, at a rate of 1 kilogram per hour. This dryer was initially driven at 200 volts and 10 amperes. Since the electric current value gained as plugging occurred in the vicinity of the nozzle, the operation performance was assessed from such gains in the current required. The results are set forth in Table 4.

When IR was fed to the dryer without addition of polyethylene glycol, the current gain reached about 30% in about 100 hours of operation. On the other hand, when the glycol was added, the dryer could be operated continously for about 500 hours, i.e. until the dryer current had increased 30%. Thus, the IR composition according to the invention was highly resistant to thermal discoloration and, although vulcanization was somewhat accelerated, its viscosity and physical properties were substantially the same as those of glycol-free IR.

Table 4

| Operation results | Sample PEG not added (control) | Polyethylene glycol added DEG[1] | PEG-1[2] | PEG-2[3] |
|---|---|---|---|---|
| 1) Time (hrs.) before the dryer became inoperable | 110 | 510 | 460 | 550 |
| 2) Current (amperes) during operation | | | | |
| (a) After 100 hours | 13 | 10 | 11 | 10 |
| (b) After 250 hours | | 12 | 11 | 11 |

Table 4-continued

| Operation results | Sample PEG not added (control) | Polyethylene glycol added DEG[1] | PEG-1[2] | PEG-2[3] |
|---|---|---|---|---|
| (c) After 400 hours | | 13 | 12 | 12 |

[1]Diethylene glycol
[2]PEG with an average molecular weight of 4000
[3]PEG with an average molecular weight of 6000

EXAMPLE 5

A screw-type dryer, manufactured by V.D. Anderson Co., was charged with IR stock with a water content of 12% and, then, at point approximately midway along the length of the dryer, a 10% aqueous solution of PPG with an average molecular weight of 1000 was added in a proportion of 2 weight parts of PPG per 100 weight parts of dry IR. The dryer was initially operated at 200 volts and 95 amperes and the operation could be continued for about 20 days until the current value had gained 30%. When wet PPG-free, IR was dried, the current (initially at 100 amperes and 20 volts) increased 30% in about 5 days and the drying operation had to be stopped substantially at that moment. The IR composition also had an excellent resistance to thermal discoloration.

EXAMPLE 6

The procedure of Example 4 was repeated except that 0.5 PHR of the polyalkylene glycol amine adducts indicated in Table 5 were respectively used in lieu of 0.2 PHR of polyethylene glycol.

The temperature of rubber in the extruder was 170° to 180° C. The dryer was initially operated at 200 volts and 10 amperes but, during the operation, the current increased as plugging occurred in the vicinity of the nozzle so that, ultimately, the drying operation had to be suspended. The changes in dryer current during the operation and the times during which the dryer could be continuously operated are shown in Table 5.

It will be seen from Table 5 that, in the absence of the aforementioned amine adducts, the current required for the operation increased 30% in 100 hours of operation but, in the presence of any of said amine adducts in the proportion of 0.5 PHR, no increase in current was encountered. The time permitted for continuous operation was increased about 6 times by the addition of any of the polyalkylene glycol-amine adducts. In the absence of such an amine adduct, traces of corrosion were noted on the internal walls of the drier when continuous operation had to be suspended. In contrast, when the amine adducts were employed, there was not evidence of corrosion notwithstanding the fact that the dryer had been operated for about 6 times as long.

Table 5

|  | Polyalkylene glycol-amine adduct | | | |
|---|---|---|---|---|
|  | None | A | B | C |
| 1) The times before the dryer became inoperable (in hours) | 110 | 630 | 650 | 600 |
| 2) Current values during the drying operaton (in amperes) | | | | |
| After 100 hours | 13 | 10 | 10 | 10 |
| After 500 hours | — | 12 | 13 | 12 |

A: 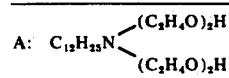

B: 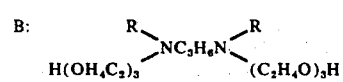

(R : alkyls containing an average of 12 carbon atoms)

C: 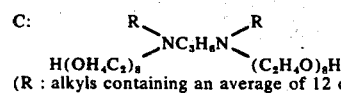

(R : alkyls containing an average of 12 carbon atoms)

The IR compositions obtained as above were mixed with the compounding ingredients indicated in Table 6 and the physical properties of the unvulcanized rubber and the vulcanizates produced therefrom (vulcanized at 135° C for 40 min.) were determined. The results are set forth in Table 7. The addition of 0.5 PHR of a polyalkylene glycolamine adduct accelerated the vulcanization and enhanced the stress at 300% elongation and the hardness of the vulcanizate.

Table 6

| Compounding ingredients | Proportions (PHR) |
|---|---|
| Sulfur | 2.25 |
| Stearic acid | 2 |
| Zinc Oxide | 5 |
| Accelerator NS* | 0.7 |
| Carbon black | 35 |

*N-t-butyl-2-benzothiazolesulfenamide

Table 7

| Item | Polyalkylene glycol-amine adduct | | | |
|---|---|---|---|---|
|  | None | A | B | C |
| (1) Vulcanization rate (Mooney scorch)[1] | | | | |
| $t_5$ (in minutes) | 29 | 14 | 14 | 17 |
| $t_{35}$ (in minutes) | 34 | 18 | 19 | 21 |
| (2) Physical properties of vulcanizate[2] | | | | |
| 300% Modulus (kg/cm²) | 114 | 125 | 129 | 121 |
| Tensile strength (kg/cm²) | 322 | 324 | 326 | 321 |
| Elongation (%) | 600 | 590 | 590 | 590 |
| Hardness | 57 | 59 | 59 | 59 |

[1]According to ASTM D 1646 (the smaller the number, the higher the rate of vulcanization)
[2]According to ASTM D 412 and ASTM D 2240.

EXAMPLE 7

The procedure of Example 6 was repeated except that IR was replaced by a styrene-butadiene copolymer rubber (SBR) containing 25 weight % of styrene. The screw-type dryer described in Example 4 was charged with the SBR(water content 16%), together with 0.5 PHR of polyalkylene glycol-amine adduct B or C used in Example 6, whereby a dry composition was obtained. The dryer was intially driven at 200 volts and 7 amperes but the current requirement increased as plugging occurred in the vicinity of the nozzle. The changes in dryer current during the operation and the time permitted for continuous operation are shown in Table 8. In the absence of said polyalkylene glycol-amine adduct, traces of corrosion were noted on the internal walls of the dryer after 190 hours of operation, but no evidence of corrosion was found even after more than 700 hours of operation when the amine adduct had been added.

Table 8

|  | Polyalkylene glycol-amine adduct | | |
|---|---|---|---|
|  | None | B | C |
| (1) The times before the dryer became inoperable (in hours) | 190 | 760 | 790 |
| (2) Current values during operation (in amperes) | | | |
| After 100 hours | 10 | 7 | 7 |
| After 500 hours | — | 11 | 11 |
| After 700 hours | — | 14 | 13 |

The compounding ingredients shown in Table 6 were mixed with the above SBR compositions and the vulcanization rates and the physical properties of vulcanizates (vulcanized at 135° C for 40 minutes) were determined. The results are set forth in Table 9.

Table 9

| Item | Polyalkylene glycol-amine adduct | | |
|---|---|---|---|
|  | None | B | C |
| (1) Vulcanization rate (Mooney scorch): | | | |
| $t_{35}$ (in minutes) | 53 | 39 | 42 |
| (2) Physical properties of vulcanizates: | | | |
| 300% Modulus (kg/cm²) | 108 | 115 | 114 |
| Hardness | 62 | 64 | 64 |

EXAMPLE 8

IR compositions were prepared by repeating the procedure of Example 6 except that, with respect to IR, 0.03 PHR, 1 PHR and 5 PHR, respectively, of the polyalkylene glycolamine adduct indicated below was added.

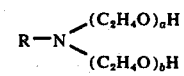

(wherein R is an alkyl radical containing an average of 12 carbon atoms; $a + b = 15$)

Each of the above compositions was allowed to stand in an air-circulating type dryer at 100° C for 24 hours and the thermal discoloration and thermal degradation properties were determined.

Rubber compounds were prepared from each of the above IR compositions according to the recipes indicated in Table 6 and their physical properties were determined. The results are summarized in Table 10. It was found that the addition of a polyalkylene glycolamine adduct brought about improvements in the thermal discoloration and thermal degradation properties of IR, the vulcanization rate of the compound and the 300% modulus and hardness of the vulcanizate (vulcanized at 135° C for 40 minutes).

Table 10

| Item | Amount of polyalkylene glycol-amine adduct (PHR) | | | |
|---|---|---|---|---|
| | 0 | 0.03 | 1 | 5 |
| (1) Resistance to thermal discoloration: | | | | |
| Hue before heating | 1 (White) | 1 (White) | 1 (White) | 1 (White) |
| Hue after heating | 9 (Yellow) | 6 (Pale yellow) | 3 (Pale yellow) | 3 (Pale yellow) |
| (2) Resistance to thermal degradation: | | | | |
| PRI % | 42 | 46 | 55 | 49 |
| (3) Vulcanization rates (Mooney scorch): | | | | |
| $t_5$ (in minutes) | 29 | 24 | 13 | 15 |
| $t_{35}$ (in minutes) | 34 | 30 | 16 | 19 |
| (4) Vulcanizates: | | | | |
| 300% Modulus (kg/cm$^2$) | 114 | 119 | 126 | 117 |
| Hardness | 57 | 58 | 59 | 58 |

EXAMPLE 9

As rubber stocks, the SBR used in Example 7, a polybutadiene rubber (BR) with a cis-1,4 content of 98% and a polystyrene-polyisoprene-polystyrene block copolymer rubber (SIS) were employed. To each of them was added 0.5 PHR of the same polyalkylene glycol-amine adduct B as used in Example 6. Otherwise, the procedure of Example 8 was repeated to prepare rubber compounds, and the hue and plasticity retention index (PRI) of the composition, the vulcanization rate of the rubber compound and the 300% modulus and hardness of the vulcanizate were determined. The PRI values were measured after heating at 100° C for 12 hours. The results are set forth in Table 11.

Table 11

| Type of rubber stock | SBR | | BR | | SIS | |
|---|---|---|---|---|---|---|
| Amount of the added amine adduct (PHR) | 0 | 0.5 | 0 | 0.5 | 0 | 0.5 |
| Resistance to thermal discoloration: | | | | | | |
| Hue before heating | 2 (Pale yellow) | 2 (Pale yellow) | 1 (Colorless) | 1 (Colorless) | 1 (White) | 1 (White) |
| Hue after heating | 6 (Yellow) | 5 (Pale yellow) | 8 (Yellow) | 5 (Pale yellow) | 9 (Yellow) | 3 (Pale yellow) |
| Resistance to thermal degradation: | | | | | | |
| PRI % | 92 | 97 | 94 | 97 | 60 | 72 |
| Vulcanization rate (Mooney scorch): | | | | | | |
| $t_{35}$ (in minutes) | 53 | 42 | 36 | 24 | — | — |
| Physical properties of vulcanizate: | | | | | | |
| 300% Modulus | 104 | 113 | 76 | 79 | — | — |
| Hardness | 62 | 64 | 60 | 61 | — | — |

What is claimed is:

1. A rubber composition comprising (A) a synthetic cis-1,4-polyisoprene rubber stock and (B) from 0.005 to 5 parts by weight per 100 parts by weight of said rubber stock of a high molecular weight alkylene oxide selected from the group consisting of:
   1. polyalkylene glycols and polyalkylene glycol monoalkyl ethers having the general formula:

$$RO(C_xH_{2x}O)_aH \quad (I)$$

wherein R is hydrogen or an alkyl radical containing 1 to 20 carbon atoms; x and a, respectively, represent numbers of at least 2;
   2. polyalkylene glycol monoesters having the general formula:

$$RCOO(C_xH_{2x}O)_aH \quad (II)$$

wherein R is an alkyl radical containing 1 to 20 carbon atoms; x and a, respectively, represent numbers of at least 2;
   3. the ammonia- or amine-polyalkylene glycol adducts of the general formula:

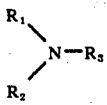
   (III)

wherein at least one of $R_1$, $R_2$ and $R_3$ is $(C_xH_{2x}O)_aH$, and the others can be hydrogen or an alkyl radical containing 1 to 20 carbon atoms; x and a, respectively, represent a number of at least 2; and
   4. the alkylene polyamine-polyalkylene glycol adducts having the general formula:

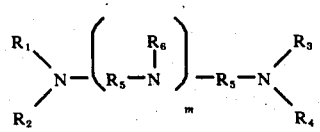
   (IV)

wherein at least one of $R_1$, $R_2$, $R_3$ and $R_4$ is $(C_xH_{2x}O)_aH$ and the others can be hydrogen or an alkyl radical containing 1 to 20 carbon atoms; $R_5$ is an alkylene radical containing 1 to 6 carbon atoms;

$R_6$ is hydrogen, an alkyl radical containing 1 to 20 carbon atoms or $(C_xH_{2x}O)_aH$; $x$ and $a$, respectively, represent a number of at least 2; and $m$ is zero or a number of at least 1.

2. A rubber composition according to claim 1, wherein the high molecular weight alkylene oxide is a polyalkylene glycol or polyalkylene glycol monoether represented by the general formula:

$$RO(C_xH_{2x}O)_aH$$

wherein R represents a hydrogen atom or an alkyl radical of 1 to 20 carbon atoms; $x$ and $a$, respectively, represent numbers of at least 2 and said alkylene oxide has a molecular weight ranging from 140 to 50,000.

3. A rubber composition according to claim 2 wherein said polyalkylene glycol is polyethylene glycol having a molecular weight of 200 to 20,000.

4. A rubber composition according to claim 2, wherein said polyalkylene glycol is polypropylene glycol having a molecular weight of 300 to 6,000.

5. A rubber composition according to claim 1, wherein the high molecular weight alkylene oxide is a polyalkylene glycol monoester represented by the general formula:

$$RCOO(C_xH_{2x}O)_aH$$

wherein R is an alkyl radical of 1 to 20 carbon atoms; $x$ and $a$, respectively, are numbers of at least 2 and said alkylene oxide has a molecular weight of 140 to 50,000.

6. A rubber composition according to claim 1, wherein the high molecular weight alkylene oxide is an ammonia or amine-polyalkylene glycol adduct represented by the general formula:

$$\begin{array}{c}R_1\\ \phantom{R_1}\diagdown\\ \phantom{R_1R_1}N-R_3\\ \phantom{R_1}\diagup\\ R_2\end{array}$$

wherein each of $R_1$, $R_2$ and $R_3$ can be $(C_xH_{2x}O)_aH$, hydrogen, or alkyl radicals of 1 to 20 carbon atoms with the proviso that at least one of $R_1$, $R_2$ and $R_3$ is $(C_xH_{2x}O)_aH$; $x$ and $a$, respectively, are numbers of at least 2 and said alkylene oxide has a molecular weight of 140 to 50,000.

7. A rubber composition according to claim 1, wherein the high molecular weight alkylene oxide is an alkylenepolyamine-polyalkylene glycol adduct of the general formula:

$$\begin{array}{c}R_1\\ \phantom{R_1}\diagdown\phantom{xxx}R_6\phantom{xxxx}R_3\\ \phantom{R_1R_1}N-(R_5-N)_m-R_5-N\\ \phantom{R_1}\diagup\phantom{xxxxxxxxxxxx}\diagdown\\ R_2\phantom{xxxxxxxxxxxxxxxxx}R_4\end{array}$$

wherein each of $R_1$, $R_2$, $R_3$ and $R_4$ can be $(C_xH_{2x}O)aH$, hydrogen, or an alkyl radical of 1 to 20 carbon atoms with the proviso that at least one of $R_1$, $R_2$, $R_3$ and $R_4$ is $(C_xH_{2x}O)_aH$; $R_5$ is an alkylene radical of 1 to 6 carbon atoms; $R_6$ is hydrogen, an alkyl radical of 1 to 20 carbon atoms or $(C_xH_{2x}O)_aH$; $x$ and $a$, respectively, are numbers of at least 2; and $m$ is 0 or a number of at least 1.

8. A rubber composition according to claim 1, wherein said rubber stock is modified synthetic cis-1,4-polyisoprene obtained by reacting the cis-1,4-polyisoprene rubber with maleic acid, maleic anhydride or maleimide.

9. A method of suppressing a tendency toward thermal discoloration and plugging of a rubber composition prior to compounding for vulcanization, which comprises feeding a wet synthetic cis-1,4-polyisoprene rubber stock to a screw-type dryer and adding thereto 0.005 to 5 weight parts per 100 weight parts of said rubber stock of a high molecular weight alkylene oxide selected from the group consisting of:

1. polyalkylene glycols and polyalkylene glycol monoalkyl ethers having the general formula:

$$RO(C_xH_{2x}O)_aH \qquad (I)$$

wherein R is hydrogen or an alkyl radical containing 1 to 20 carbon atoms; $x$ and $a$, respectively, represent numbers of at least 2;

2. polyalkylene glycol monoesters having the general formula:

$$RCOO(C_xH_{2x}O)_aH \qquad (II)$$

wherein R is an alkyl radical containing 1 to 20 carbon atoms; $x$ and $a$, respectively, represent numbers of at least 2;

3. the ammonia- or amine-polyalkylene glycol adducts of the general formula:

$$\begin{array}{c}R_1\\ \phantom{R_1}\diagdown\\ \phantom{R_1R_1}N-R_3\\ \phantom{R_1}\diagup\\ R_2\end{array} \qquad (III)$$

wherein at least one of $R_1$, $R_2$ and $R_3$ is $(C_xH_{2x}O)_aH$, and the others can be hydrogen or an alkyl radical containing 1 to 20 carbon atoms; $x$ and $a$, respectively, represent a number of at least 2; and 4. the alkylene polyamine-polyalkylene glycol adducts having the general formula:

$$\begin{array}{c}R_1\\ \phantom{R_1}\diagdown\phantom{xxx}R_6\phantom{xxxx}R_3\\ \phantom{R_1R_1}N-(R_5-N)_m-R_5-N\\ \phantom{R_1}\diagup\phantom{xxxxxxxxxxxx}\diagdown\\ R_2\phantom{xxxxxxxxxxxxxxxxx}R_4\end{array} \qquad (IV)$$

wherein at least one of $R_1$, $R_2$, $R_3$ and $R_4$ is $(C_xH_{2x}O)_aH$ and the others can be hydrogen or an alkyl radical containing 1 to 20 carbon atoms; $R_5$ is an alkylene radical containing 1 to 6 carbon atoms; $R_6$ is hydrogen, and alkyl radical containing 1 to 20 carbon atoms or $(C_xH_{2x}O)_aH$; $x$ and $a$, respectively, represent a number of at least 2; and $m$ is zero or a number of at least 1, before the rubber is discharged from said dryer.

10. A method according to claim 9, wherein said alkylene oxide compound is a polyalkylene glycol having a molecule weight of 140 to 50,000.

* * * * *

UNITED STATES PATENT OFFICE
CERTIFICATE OF CORRECTION

Patent No. 4,033,933  Dated July 5, 1977

Inventor(s) Akira Shimizu et al.

It is certified that error appears in the above-identified patent and that said Letters Patent are hereby corrected as shown below:

Title of invention should read -- STABILIZED RUBBER COMPOSITIONS AND METHODS FOR PRODUCTION THEREOF --.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*